No. 617,276. Patented Jan. 3, 1899.
J. BOYD.
MECHANISM FOR GUIDING AND APPLYING TENSION TO SPINDLE DRIVING BANDS.
(Application filed Feb. 21, 1898.)
(No Model.) 6 Sheets—Sheet 1.
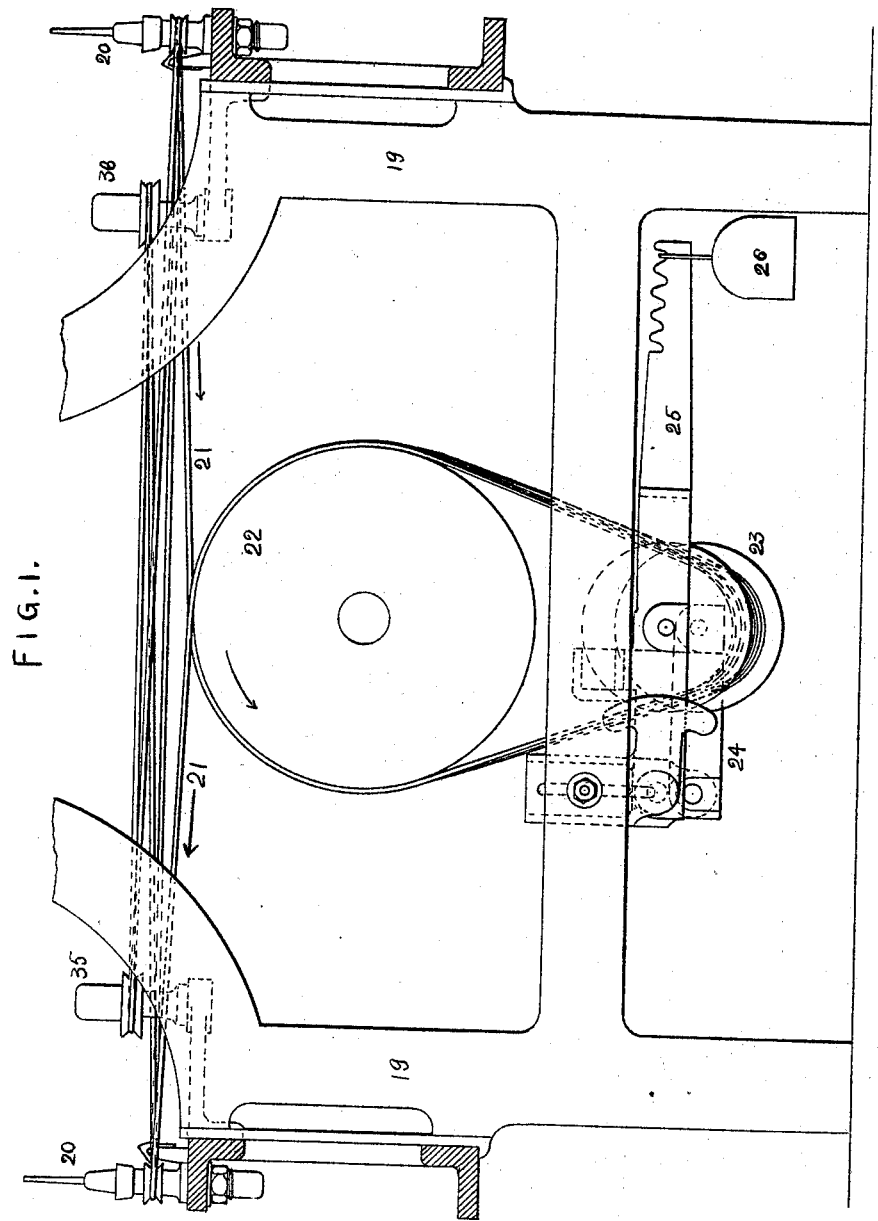
WITNESSES:
F. W. Wright.
M. N. Miles
INVENTOR
JOHN BOYD
BY
Howson and Howson
HIS ATTORNEYS.

No. 617,276. Patented Jan. 3, 1899.
J. BOYD.
MECHANISM FOR GUIDING AND APPLYING TENSION TO SPINDLE DRIVING BANDS.
(Application filed Feb. 21, 1898.)
(No Model.) 6 Sheets—Sheet 2.
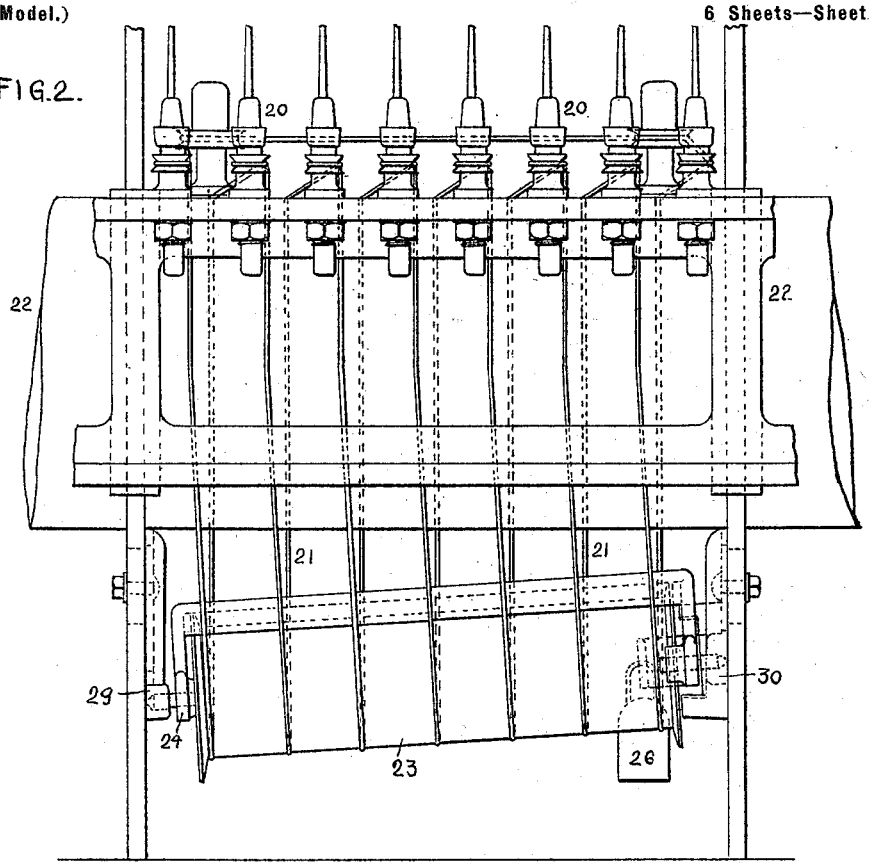
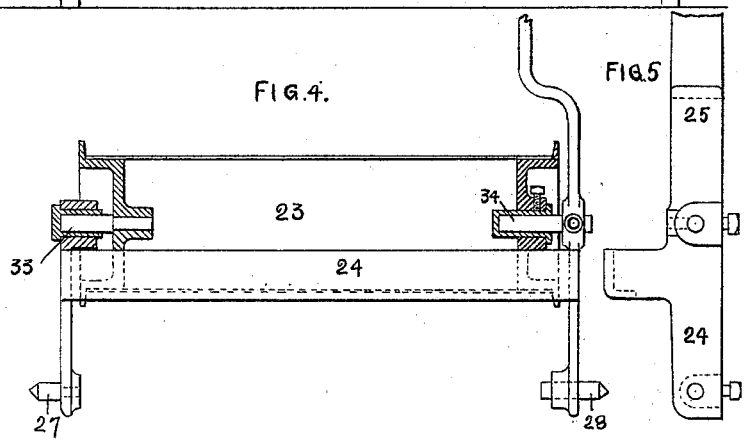
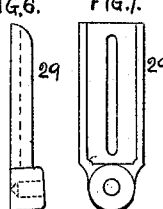
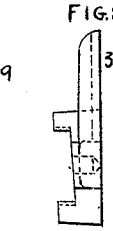
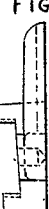
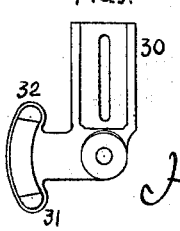
WITNESSES:
P. W. Wright
M. H. Miles.
INVENTOR
JOHN BOYD
BY
Howson and Howson
HIS ATTORNEYS No. 617,276.  
Patented Jan. 3, 1899.

J. BOYD.
MECHANISM FOR GUIDING AND APPLYING TENSION TO SPINDLE DRIVING BANDS.
(Application filed Feb. 21, 1898.)

(No Model.)  
6 Sheets—Sheet 3.

WITNESSES:  
J. W. Wright.  
M. H. Miles.

INVENTOR  
JOHN BOYD  
BY  
Howson and Howson  
HIS ATTORNEYS

No. 617,276. Patented Jan. 3, 1899.
J. BOYD.
MECHANISM FOR GUIDING AND APPLYING TENSION TO SPINDLE DRIVING BANDS.
(Application filed Feb. 21, 1898.)
(No Model.) 6 Sheets—Sheet 4.
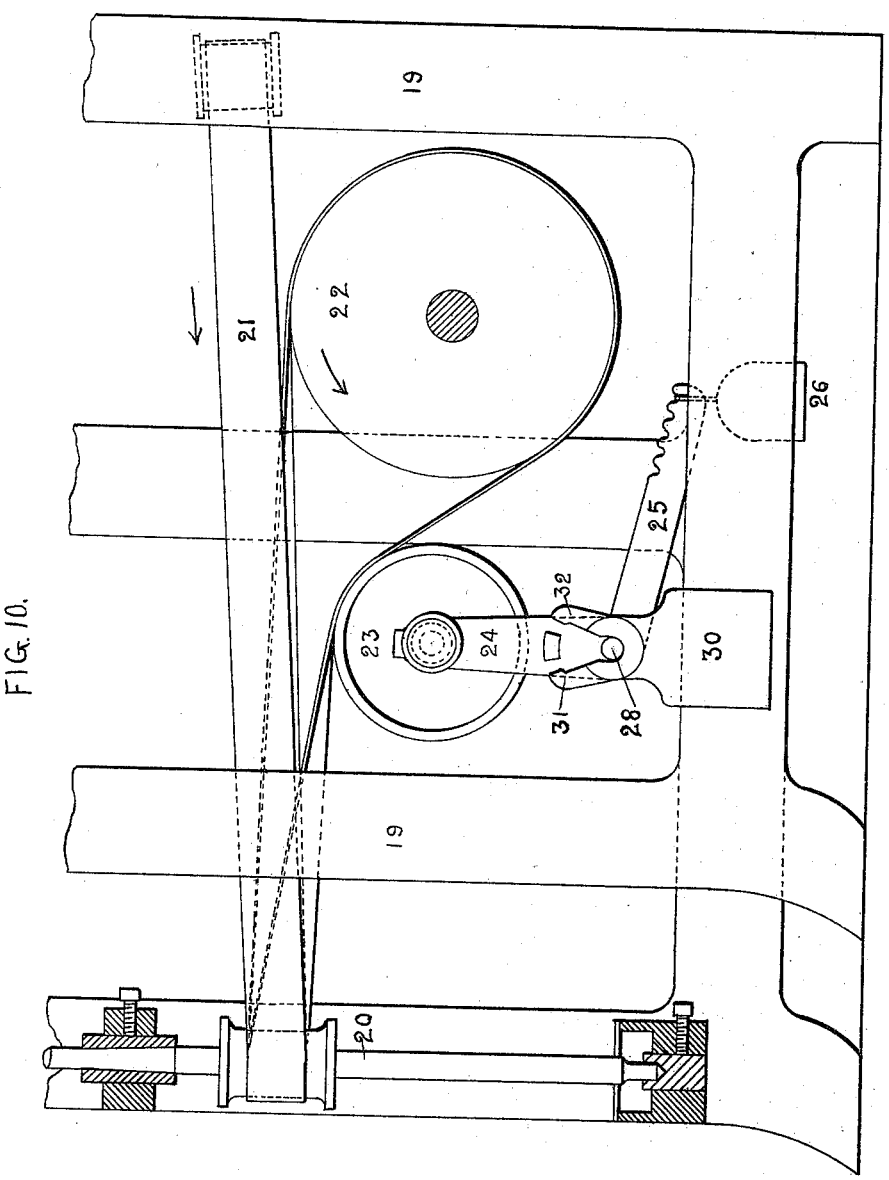
WITNESSES:
F. W. Wright
INVENTOR
JOHN BOYD
BY
Howson and Howson
his ATTORNEYS No. 617,276. Patented Jan. 3, 1899.
J. BOYD.
MECHANISM FOR GUIDING AND APPLYING TENSION TO SPINDLE DRIVING BANDS.
(Application filed Feb. 21, 1898.)
(No Model.) 6 Sheets—Sheet 5.
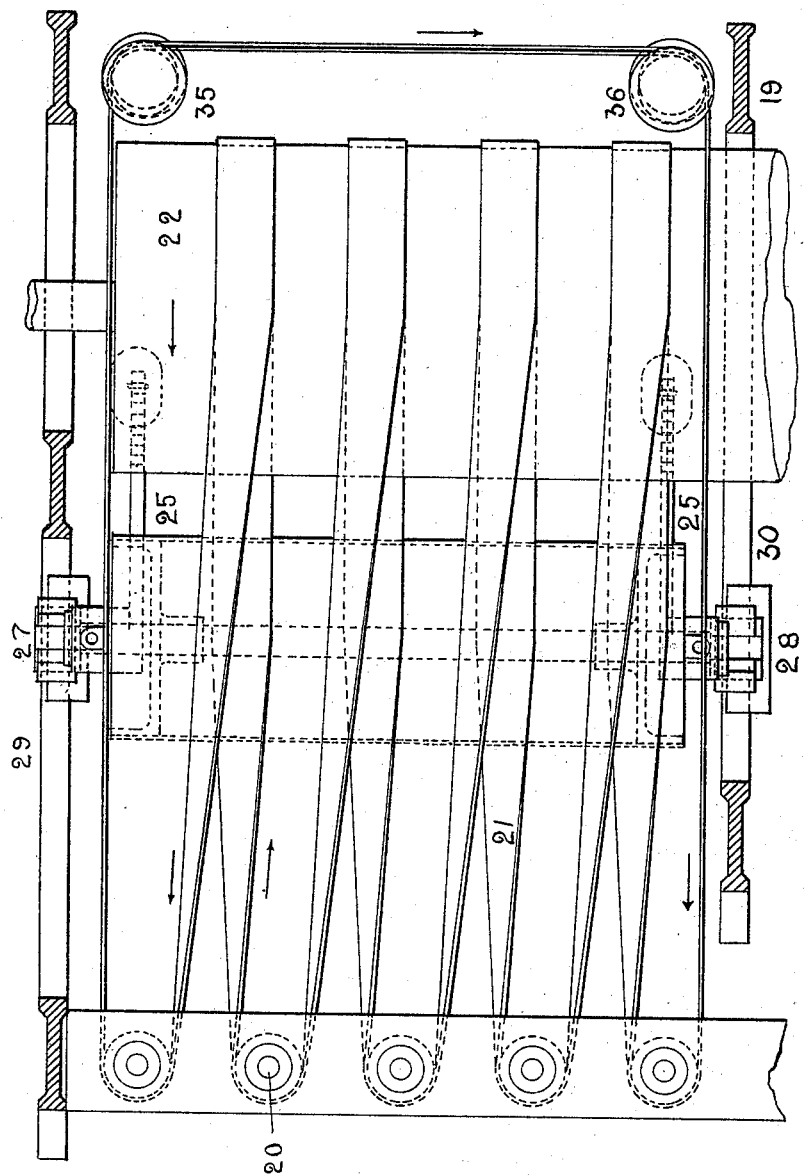
WITNESSES:
P. W. Wright
M. H. Miles
INVENTOR
John Boyd
BY
Howson and Howson
his ATTORNEYS No. 617,276. Patented Jan. 3, 1899.
J. BOYD.
MECHANISM FOR GUIDING AND APPLYING TENSION TO SPINDLE DRIVING BANDS.
(Application filed Feb. 21, 1898.)
(No Model.) 6 Sheets—Sheet 6.

WITNESSES:
F. W. Wright
M. H. Miles

INVENTOR
JOHN BOYD
BY
Howson and Howson
his ATTORNEYS

UNITED STATES PATENT OFFICE.

JOHN BOYD, OF GLASGOW, SCOTLAND.

MECHANISM FOR GUIDING AND APPLYING TENSION TO SPINDLE-DRIVING BANDS.

SPECIFICATION forming part of Letters Patent No. 617,276, dated January 3, 1899.

Application filed February 21, 1898. Serial No. 671,029. (No model.)

*To all whom it may concern:*

Be it known that I, JOHN BOYD, a subject of the Queen of Great Britain and Ireland, and a resident of Glasgow, county of Lanark, Scotland, have invented improvements in mechanism for guiding and applying tension to spindle-driving bands of spinning, twisting, winding, and similar machines, of which the following is a specification.

This invention comprises improvements designed for spinning, twisting, winding, and similar machines for fibrous materials, and pertains particularly to the spindle-driving bands for said machinery and to improved devices for guiding and tensioning said bands, whereby a regular rotary motion is imparted to the spindles (or in the case of dead-spindles to the tubes or fliers which work thereon) and a uniform twist is imparted to the fibrous material which may be twisted thereby.

Figure 3:
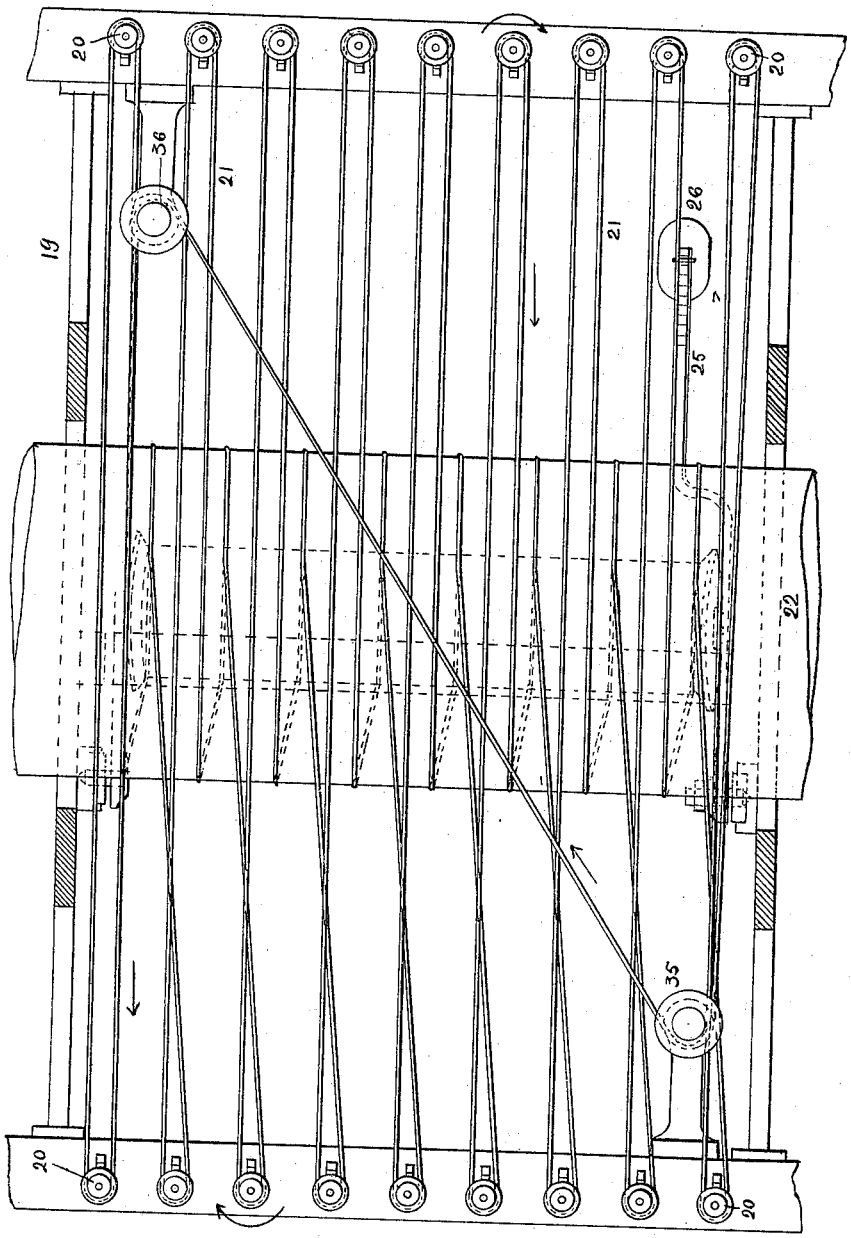
Figure 12:
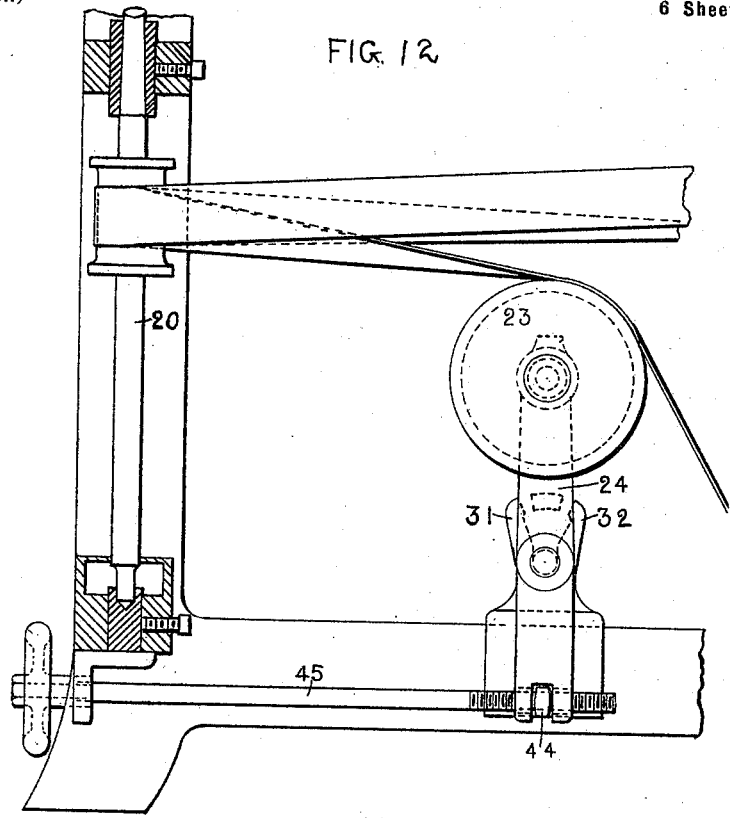
Figure 13:
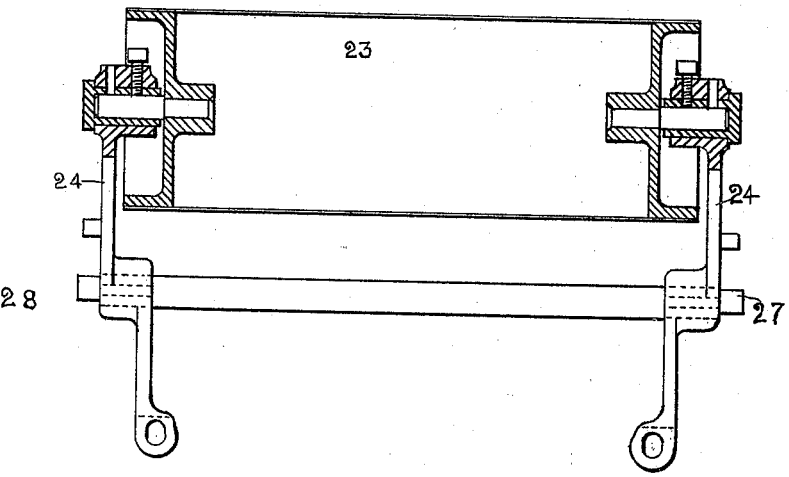

In the accompanying drawings, Figure 1 is a vertical section of so much of a spinning-frame as is necessary to illustrate certain parts of one modification of my invention. Fig. 2 is a front elevation, and Fig. 3 is a plan, of the same; and Figs. 4 to 9, inclusive, are separate views of some details of Figs. 1, 2, and 3. Fig. 10 is a vertical section, and Fig. 11 a plan view of a modification. Figs. 12 and 13 are other two views showing another modification.

In the construction illustrated in Figs. 1, 2, and 3 I have shown my improved mechanism as applied to a section of an ordinary ring-spinning frame 19, having eight spindles 20 on each side, all driven by one endless spindle-driving band 21, actuated by a central horizontal driving-cylinder 22, the top of which is slightly under the center of the pulleys of the spindles 20 on each side. An auxiliary idle-cylinder 23 is provided, which may be placed (when there is room for it) right under the driving-cylinder 22 for the purpose of guiding and tensioning the band 21. The auxiliary cylinder 23 is carried by a swinging bracket 24, Figs. 4 and 5, having a projecting arm 25, with an adjustable weight 26, and on its other side, at its two opposite corners, pivoting-centers 27 and 28, by which it is hinged to fixed parts of the framing 19 or to brackets 29 and 30, Figs. 6 to 9, fixed thereon. On one of the brackets or on the framing there are snugs 31 and 32, between which one arm of the carrier 24 swings and by which its radial motion is limited. The centers 27 and 28 of the carrier are by preference made parallel with its cylinder 23, and the latter is not set parallel with the horizontal driving-cylinder, but higher at one end, so that in addition to tensioning the band 21 it may also guide all the coils of the latter passing around the two cylinders 22 and 23, (as will afterward be explained,) so that they may all be made to run entirely clear of one another. The auxiliary cylinder 23 (when working in this angled position) has a live footstep-spindle 33 at its lower end, working into a cup-bush of the carrier 24, and a dead-spindle 34, working in a cup-bush of the cylinder 23 at its higher end, so as to retain oil and be easily lubricated. When "banding" the spindles 20, beginning at one end of the auxiliary cylinder 23, the band is taken alternately right round the two cylinders 22 and 23 and round two of the ring-spindles 20, one on each side, till the last two spindles are banded, after which the band is taken round two guide-pulleys 35 and 36 (placed nearly at opposite ends of the frame or section thereof) and back to the starting-point, when the two ends of the band are fastened together after being drawn tight, so as to bring the auxiliary cylinder 23 as close as it can be drawn to the driving-cylinder 22. The direction of revolution is indicated by arrows. The auxiliary cylinder in this modification is pulled away from the driving-cylinder 22 by its own weight and that of the carrier 24 and its adjustable weight 26 and thereby very equally tensions and takes up the slack of all the loops of the spindle-driving band which pass round the two cylinders, which, according to the length of the auxiliary cylinder and the pitch of the spinning-frame, may vary from two coils and upward. The band gives at the same time a regular rotary motion to all the ring-spindles it drives.

Instead of the band being carried alternately round the two cylinders 22 and 23 and round one spindle 20 on each side it may be carried alternately once round the two cylinders 22 and 23 and round two spindles 20 on each side, which makes the banding of the spindles much easier and the band much shorter.

Instead of the auxiliary cylinder 23 being angled longitudinally in relation to the driving-cylinder 22, as shown and described, for the purpose of guiding the band 21 it may be angled transversely, which will serve the same purpose, though not quite so well.

When it is required (as in stop-motion twisters) to cause the banding to run clear of parts of mechanism immediately behind the spindles, it may be necessary in some cases to angle the auxiliary cylinder in relation to its driving-cylinder both longitudinally and transversely.

When the auxiliary cylinder 23 is used at one side of a driving-cylinder 22 instead of under it, it is preferable to have live-spindles 33 revolving in cup-bushes, such as are shown at the left hand of Fig. 4, at both ends of it, as the latter in this case, though angled as formerly in relation to the driving-cylinder 22, may be worked to advantage in a horizontal or almost horizontal position. Various other parts of the mechanism would also require to be altered in form to adapt them properly for the position they would then occupy.

In the modification of my improved mechanism shown in Figs. 10 and 11 it is applied to a section of a flier-spinning frame 19, having five spindles 20 on one side only, all driven by one endless spindle-driving band 21, (which in this modification is shown working with a flat band or belt,) actuated by a horizontal driving-cylinder 22. A movable auxiliary idle-cylinder 23 is placed between the spindles 20 and the driving-cylinder and a little lower than the latter for the purpose of guiding and tensioning the band 21. The auxiliary cylinder 23 is carried by a swinging bracket 24, having an adjustable weight 26 and pivoting-centers 27 and 28, formed by the projecting ends of the shaft, by which it is hinged to fixed parts of the framing 19 or to brackets 29 and 30 fixed thereon. On one or both of the brackets or in the framing are snugs 31 and 32, between which a projection of the carrier 24 swings and by which its radial motion is limited. The auxiliary cylinder 23 may in this case be made parallel with the driving-cylinder 22, and is made to strain the loops of the endless band in the direction of the driving-cylinder. In banding the spindles 20 the band 21 is taken from beginning to end of the section alternately over the auxiliary cylinder 23, under and over the driving-cylinder 22, and round one of the flier-spindles 20, or round two of the flier-spindles 20, as in the first construction, and, lastly, round two guide-pulleys 35 and 36, back to the starting-point, when the band is tightened and the two ends fastened together.

Instead of the loops of the band 21 being strained by the adjustable weights 26, hanging on the bell-crank arms 25 of the swing-bracket 24, both or one of the end pieces may have a lever projected downward, as shown in Figs. 12 and 13, a screwed nut 44 at its extreme end, and a screw 45 let into same, by the outer end of which projecting in front of the machine the strain on the band can be easily adjusted, which method of tightening bands can also be applied, when desirable, to some of the other modifications.

By extending any of the two modifications of my improved mechanism a much larger number of spindles can be driven by one band than it is possible to show in the drawings referring to same.

Flat as well as round bands (if not too broad) can be used with the first modification if the spindle-pulleys 20 and other pulleys are made suitable for same.

Both modifications can be easily adapted, so that the driving and auxiliary cylinders may be placed above the line of the pulleys of spindles which they are driving, and the last modification can be easily adapted for driving spindles in a horizontal or angled position.

I claim as my invention—

In spinning, twisting, winding and similar machines, the combination of an endless band for driving a number of spindles with a horizontal driving-cylinder, an auxiliary idle-cylinder, round which two or more coils of the band pass, movable bearings for said idle-cylinder and one or more guide-pulleys to bring the endless band back to the position from which it starts, substantially as described.

In testimony whereof I have signed my name to this specification in the presence of two subscribing witnesses.

JOHN BOYD.

Witnesses:
JNO. M. TADGEAN,
JOHN M. MCCOLL.